United States Patent [19]

Zugel

[11] Patent Number: 4,644,819
[45] Date of Patent: Feb. 24, 1987

[54] HIGH-LOW SPEED DRIVE SYSTEM FOR MULTIPLE SPINDLE MACHINES

[75] Inventor: Martin J. Zugel, Euclid, Ohio

[73] Assignee: Leggett & Platt Incorporated, Cleveland, Ohio

[21] Appl. No.: 777,206

[22] Filed: Sep. 18, 1985

[51] Int. Cl.[4] .................................................. F16H 37/06
[52] U.S. Cl. ................................. 74/665 B; 74/665 A; 74/665 G; 74/665 P; 82/28 R; 192/48.9; 192/87.15
[58] Field of Search .................. 82/28 R, 29 R, 29 A, 82/29 B; 74/665 A, 665 G, 665 GC, 665 GD, 665 B, 665 GB, 665 P; 192/48.8, 48.9, 87.14, 87.15, 87.18

[56] References Cited

U.S. PATENT DOCUMENTS

| | | | |
|---|---|---|---|
| 3,090,267 | 5/1963 | Trumpp | 82/28 X |
| 3,103,838 | 9/1963 | Beacom et al. | 82/28 R |
| 3,385,145 | 5/1968 | Jacoby | 82/29 R |
| 3,864,994 | 2/1975 | White | 82/28 R X |
| 3,871,246 | 3/1975 | Craven | 74/665 GD |
| 4,476,752 | 10/1984 | Hessbruggen | 82/28 R |
| 4,563,925 | 1/1986 | Link | 82/28 R |

Primary Examiner—Leslie Braun
Assistant Examiner—Dwight G. Diehl
Attorney, Agent, or Firm—Renner, Otto, Boisselle & Lyon

[57] ABSTRACT

High-low speed drive system includes a main drive shaft which may be selectively driven off one or the other of a pair of continuously driven high and low speed shafts by selective engagement and disengagement of associated pneumatic operated disc clutches. Such clutches have fast response times, and the clutch associated with the low speed shaft acts as a brake when engaged to rapidly decelerate the main drive shaft down to the speed of the low speed shaft. The timing of both the high speed and low speed pneumatic operated disc clutches are closely controlled so that the low speed clutch is engaged practically instantaneously with the disengagement of the high speed clutch. The clutches are located in substantial radial alignment with each other in close proximity to the gear train between the high and low speed shafts and main drive shaft within the main housing for ease of maintenance and simplified porting of fluid through lines on the same path to all of the clutches. If desired, a third pneumatic operated disc clutch may be provided on the main drive shaft to provide for independent braking or holding of the main drive shaft against rotation during secondary operations upon disengaging both of the high and low speed pneumatic operated disc clutches and engaging the main drive shaft pneumatic operated disc clutch.

19 Claims, 2 Drawing Figures

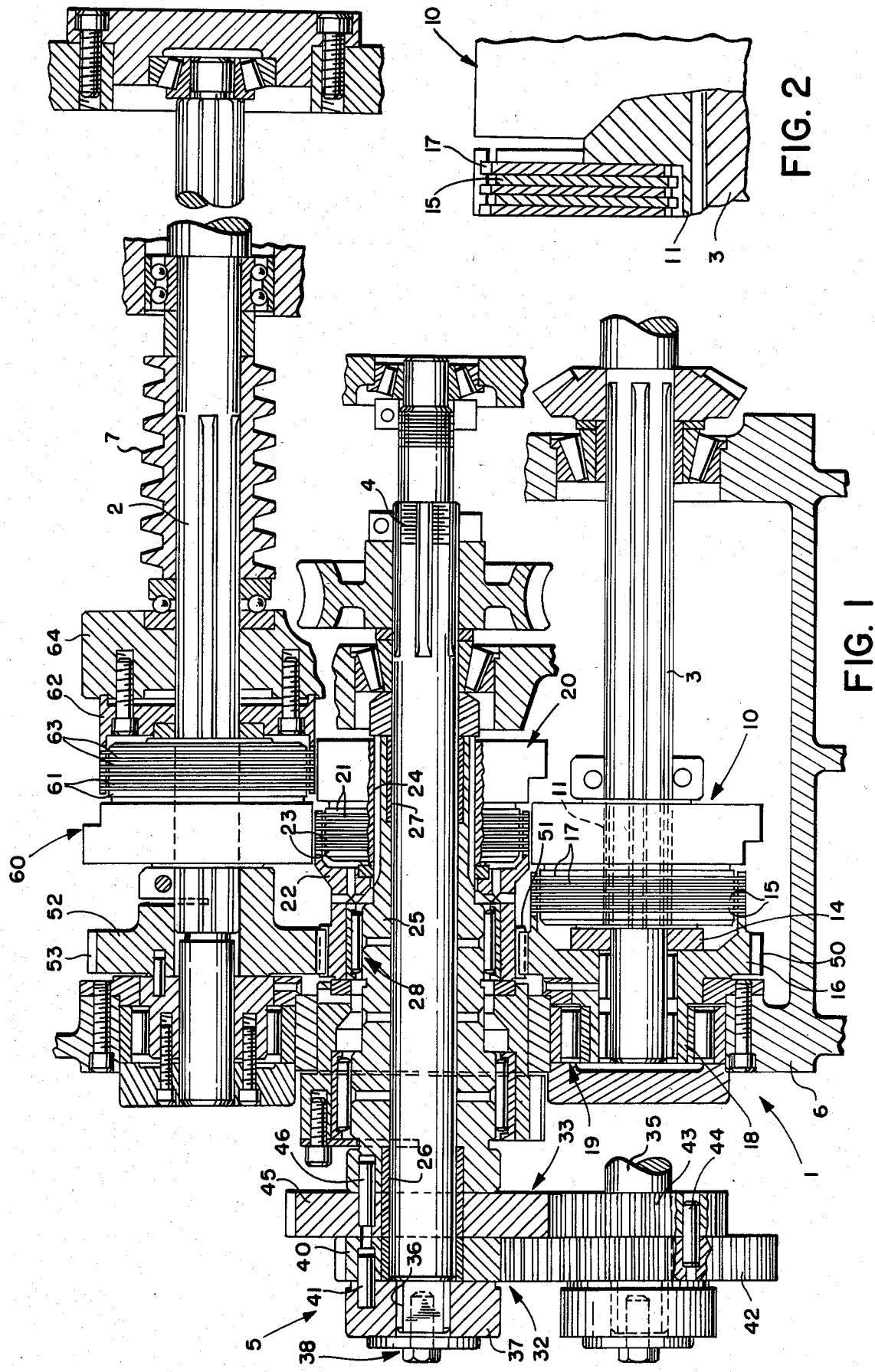

HIGH-LOW SPEED DRIVE SYSTEM FOR MULTIPLE SPINDLE MACHINES

BACKGROUND OF THE INVENTION

This invention relates generally as indicated to a high-low speed drive system for multiple spindle machines, and more particularly to certain improvements in such a drive system which permit more rapid and precise changing of the main drive shaft speed from high idle speed to low machining speed and then back to high idle speed during each complete cycle of machine operation for increased machine production.

In a multiple spindle machine, the main drive system provides a means of transmitting power and controlling the various machine tool operations, including the feeding of the bar stock, the indexing of the bar stock carrying spindles, the feeding of the tool carrying slides, and the cutting off of the finished work. All of these machine operations are controlled by a main drum shaft which is alternately driven by a main drive shaft (normally referred to as the large worm shaft) at a high idle speed for a predetermined period of time, then at a predetermined low machining speed and then back to the high idle speed during each complete cycle of machine operation.

The high speed idle time is the time required to withdraw the machine tool slides, index the spindle carrier, open each collet, feed the bar stock, close the collets, and bring the tools carried by the slides up to the work. The low speed machining time, on the other hand, is the time required to perform all machining operations. All of the motion which occurs during both the high speed idle time and low speed machining time is controlled by the main drum shaft which is driven at the desired high and low speeds by a high-low speed drive system.

Heretofore, one such known drive system included a lever operated mechanical disc clutch associated with the high speed shaft for driving the main drive shaft and thus the main drum shaft at the higher idle speed and an overrunning roll clutch associated with the low speed shaft for driving the main drive shaft and thus the main drum shaft at the lower machining speed. One drawback of such a system was that the tools could not be moved all the way up to the work during the rapid advance of the tool slides toward the work in that when the high speed mechanical disc clutch was disengaged, sufficient room had to be provided between the tools and work to permit a standard wrap around drag brake on the main drive shaft to be mechanically actuated to slow the main drive shaft down to the speed of the low speed shaft so that the overrunning roll clutch would engage to advance the tool slides under the positive control of the roll clutch before the tools engaged the work.

Another disadvantage in using such a roll clutch and drag brake was that the drag brake wore out too fast and had to be constantly adjusted because the coefficient of friction of the drag brake kept changing due to the heat generated during braking. As the brake began to wear or get out of adjustment, the tools had to be backed off even further to allow for a greater margin of error. This problem was further magnified with advancements in the index mechanisms which permitted the indexing speeds of the spindle carrier and speed of rotation of the main drive shaft to be increased during idle to reduce cycle time. Also, the use of such a standard brake had the further disadvantage that there was no convenient way to dissipate the heat generated during the braking operation.

SUMMARY OF THE INVENTION

With the foregoing in mind, it is a principal object of this invention to provide a less complicated and more effective drive system for more smoothly changing the speed of the main drive shaft (and thus the main drum shaft driven thereby) from high idle speed to low machining speed and then back to high idle speed during each complete machine cycle.

Another object is to provide a drive system which has more positive control over the movements of the tool slides for smooth operation at high cycling rates.

Still another object is to provide such a drive system which has more precise control over the end position of the tools relative to the work during rapid advance of the tools during idle.

A further object is to provide such a drive system which substantially reduces or eliminates the need for having to continually adjust or monitor the final desired end position of the tools relative to the work during rapid advance of the tools during idle.

Yet another object is to provide a drive system which eliminates the need for a conventional friction brake and its attendant problems.

Another object is to provide for ease of assembly and installation and ease of maintenance of such a drive system either in a new multiple spindle machine or for the retrofitting of an existing machine.

Still another object is to provide for ease of accessibility to the drive system to facilitate the making of repairs and/or replacement of parts.

A further object is to provide for the internal lubrication of the various moving parts of such a drive system.

Another object is to provide such a drive system which permits the independent braking of the main drive shaft on command without the use of a conventional friction brake and its attendant problems to hold the drum shaft against rotation during secondary machining operations such as milling or cross drilling operations.

These and other objects of the present invention may be achieved by utilizing pneumatic operated disc clutches in the drive system which when selectively engaged and disengaged drivingly connect one or the other of the high and low speed shafts to the main drive shaft. Such pneumatic operated disc clutches have fast response times, thereby allowing the speed of the main drive shaft to be quickly changed from high speed to low speed and vice versa. Also, the low speed pneumatic operated disc clutch acts as a brake when engaged to rapidly decelerate the main drive shaft down to the speed of the low speed shaft. The timing of both the high speed and low speed pneumatic operated disc clutches is closely controlled so that the high speed pneumatic operated disc clutch is disengaged and the low speed pneumatic operated disc clutch is engaged practically instantaneously.

The design of such pneumatic operated disc clutches is such that they can readily be used on both new multiple spindle machines and for the retrofitting of existing machines that include a lever operated mechanical disc clutch to drive the main drum shaft at the higher idle speed and an overrunning roll clutch to drive the main drum shaft at the lower machining speed. Also, pneumatic operated disc clutches have the advantage over hydraulic or electro-magnetic clutches in that with pneumatic operated disc clutches the operator is better able to control the hardness or softness of engagement of the clutches for smooth operation at high cycling rates.

The pneumatic operated disc clutch associated with the low speed shaft is uniquely fitted within a restricted space in the main housing of a multiple spindle machine in substantial radial alignment with the pneumatic operated disc clutch associated with the high speed shaft to facilitate spraying of both clutches with lubricating fluid. Also, the clutches are desirably located in close proximity to the gear train between the high and low speed shafts and main drive shaft for ease of maintenance and simplified porting of air through lines on the same path to all of the clutches.

If desired, a pneumatic operated disc brake may be mounted on the main drive shaft to provide for independent braking of the main drive shaft upon disengaging both the high and low speed pneumatic operated disc clutches and engaging the main drive shaft pneumatic operated disc brake to hold the drum shaft against rotation during secondary machining operations on the work such as milling and cross drilling.

To the accomplishment of the foregoing and related ends, the invention, then, comprises the features hereinafter fully described and particularly pointed out in the claims, the following description and the annexed drawing setting forth in detail a certain preferred embodiment of the invention, this being indicative, however, of but one of the various ways in which the principles of the invention may be employed.

BRIEF DESCRIPTION OF THE DRAWING

In the annexed drawing:

FIG. 1 is a fragmentary longitudinal section through a preferred form of high-low speed drive system for multiple spindle machines according to the present invention; and FIG. 2 is an enlarged fragmentary section through one of the clutches schematically showing how the clutch discs and cage discs are keyed to the associated clutch hub portion and clutch cage, respectively.

DETAILED DESCRIPTION OF THE PREFERRED EMBODIMENT

Referring now in detail to the drawing, a preferred form of high-low speed drive system in accordance with this invention is generally designated by reference numeral 1. As shown, such drive system 1 includes a main drive shaft 2 which may be selectively coupled either to a continuously driven high speed shaft 3 or to a low speed shaft 4 for driving the main drive shaft at a high or low speed. The main drive shaft 2, which is commonly referred to as the main worm shaft, has a large worm 7 for engagement with a main drum shaft (not shown) which is used to transmit power and control in known manner the operation of the various machine tool mechanisms of a multiple spindle machine including the feeding of the bar stock, the indexing of the bar stock carrying spindles, the feeding of the tool carrying slides, and the cutting off of the finished work, none of which is shown.

During normal operation, the main drive shaft 2 (and thus the main drum shaft) is alternately driven off the high speed shaft 3 at a high idle speed for a predetermined period of time, then off the low speed shaft 4 at a predetermined low machining speed, and then once again off the high speed shaft during each complete cycle of machine operation. The high speed idle time is the time required to withdraw the machine tool slides, index the spindle carrier, open the collets, feed the bar stock, close the collets, and bring the tools carried by the slides up to the work. The low speed machining time, on the other hand, is the time required to perform all machining operations.

Both the high speed shaft 3 and low speed shaft 4 may be continuously driven off the same input drive shaft, with different gearing (not shown) being provided to drive each shaft at the desired different respective high and low speeds. Also, a suitable feed change gear mechanism 5 may be provided at the outboard end of the low speed shaft 4 exteriorly of the main housing 6 of the multiple spindle machine to vary the speed of the output from the low speed shaft as described hereafter.

To selectively couple the main drive shaft 2 to the high speed shaft 3, a pneumatic operated disc clutch 10 is mounted on the high speed shaft interiorly of the main housing 6. The high speed shaft clutch 10 may be of conventional type and includes a hub portion 11 having a splined connection with the shaft 3 as schematically shown in FIG. 2. Associated with the clutch hub portion 11 are a plurality of axially movable clutch discs having a splined connection with the hub portion as further schematically shown in FIG. 2, whereby both the hub portion 11 and clutch discs 15 rotate with the high speed shaft.

Surrounding the clutch discs 15 is a clutch cage 16 which supports a plurality of cage discs 17 received between the clutch discs 15. The clutch cage includes a hub portion 18 supported by bearings 19 on the high speed shaft to permit relative rotation between the clutch cage and high speed shaft and thus between the cage discs 17, which rotate with the clutch cage but have limited axial movement because of a splined connection between the cage discs 17 and clutch cage (see FIGS. 1 and 2), and the clutch discs as long as the clutch is disengaged. However, when the high speed shaft pneumatic disc clutch 10 is engaged, the associated clutch discs 15 are moved axially into frictional engagement with the cage discs 17 to cause the high speed clutch cage 16 to be driven by the high speed shaft 3. A bronze spacer 14 may be mounted on the high speed shaft 3 between the clutch cage hub 18 and clutch discs 15 to maintain the desired separation therebetween.

Another pneumatic operated disc clutch 20 similar to the high speed clutch 10 is mounted on the low speed shaft 4. The low speed shaft clutch 20, like the high speed shaft clutch 10, is located interiorly of the main housing 6, and such clutches 10, 20 are desirably in substantial radial alignment with each other with at least portions of the clutches axially overlapping one another for a purpose to be subsequently described. The low speed shaft clutch 20 also includes axially spaced apart clutch discs 21 surrounded by a clutch cage 22 with cage discs 23 extending therefrom between the clutch discs, similar to the high speed shaft clutch. If desired, the low speed shaft clutch hub portion 24 could be mounted directly on the low speed shaft for rotation therewith, in which event the feed change gear mechanism would be used to directly drive the low-speed shaft at the desired machining speed. However, in the form of the invention shown, the low speed shaft clutch hub portion 24, rather than being splined to the low speed shaft for rotation therewith, is splined to an idler gear sleeve 25 coaxially mounted on the low speed shaft for relative rotation as by a pair of longitudinally spaced bronze bushings 26, 27. The clutch discs 21 are in turn splined to the hub portion 24 for rotation therewith, similar to the clutch discs 15 shown in FIG. 2. Likewise, the cage discs 23 are splined to the clutch cage 22 for rotation therewith. Also, the low speed clutch cage 22 is rotatably mounted on the idler gear sleeve 25 as by means of a roller bearing 28.

In this case, when the low speed shaft clutch 20 is disengaged, the low speed clutch cage 22 is free to rotate relative to the idler gear sleeve 25 and thus the low speed shaft 4. However, when the low speed shaft clutch is engaged, the low speed clutch cage is drivingly connected to the idler gear sleeve 25 which is in turn driven by the low speed shaft 4 through the feed change gear mechanism 5 at the outboard end of the low speed shaft.

The particular feed change gear mechanism shown includes two sets 32, 33 of gears each having one gear mounted for rotation on the low speed shaft 4 and another gear mounted for rotation on a feed change gear shaft 35 suitably supported by the main housing 6. At the outermost end of the low speed shaft is a splined end portion 36 of reduced diameter for driving a drive hub 37 thereon held in place as by means of a bolt and washer assembly 38. The drive hub in turn drives one of the gears 40 of one of the feed change gear sets 32 as by means of a pin connection 41 therebetween. The other gear 42 of such one gear set is in meshing engagement with the first gear 40, and drives one of the gears 43 of the other gear set 33 through a pin connection 44 therebetween. The one gear 43 of the other gear set is in turn in meshing engagement with the other gear 45 of such other gear set, which is in turn drivingly connected to the idler gear sleeve 25 through a pin connection 46 therebetween. To change the speed of rotation of the idler gear sleeve 25, all that is necessary is to change one or both of the gear sets 32, 33.

Both the high and low speed clutch cages 16, 22 have external gear teeth 50, 51 formed integrally on the respective hub portions thereof which are in meshing engagement with each other. Likewise, a gear 52 on the main drive shaft 2 has its teeth 53 in meshing engagement with the gear teeth 51 on the low speed clutch cage 22. Accordingly, when the high speed shaft pneumatic operated disc clutch 10 is engaged and the low speed shaft pneumatic operated disc clutch 20 is disengaged, the main drive worm shaft 2 will be driven by the high speed shaft 3 at the high idle speed. That is, when the high speed shaft clutch 10 is engaged, the high speed clutch cage 16 will be driven by the high speed shaft. The low speed shaft clutch 20, on the other hand, being disengaged, allows the low speed clutch cage 22 to freely rotate relative to the idler gear sleeve 25, whereby the high speed clutch cage 16 drives the main drive worm shaft through the low speed clutch cage 22 and gear 52.

Conversely, when the low speed shaft clutch 20 is engaged and the high speed shaft clutch 10 is disengaged, the main drive worm shaft 2 will be driven by the idler gear sleeve 25 at the lower machining speeds. That is, when the low speed shaft clutch is engaged, the low speed clutch cage 22 is driven by the idler gear sleeve which in turn drives the main drive worm shaft. The high speed shaft clutch 10 being disengaged, the high speed clutch cage 16 is free to rotate relative to the high speed shaft and therefore becomes an idler which is driven by the low speed clutch cage 22.

The use of such pneumatic operated disc clutches 10, 20 have the advantage that they require less adjustment, take up wear automatically, and are more positive than the lever operated mechanical disc clutches and overrunning roll clutches and drag brakes previously used. That is, pneumatically operated disc clutches have greater precision and repeatability of engagement as compared to mechanical disc clutches. Also, they are substantially instantaneous in their operation, and do not require any linkage mechanisms to operate them. Moreover, when the low speed shaft clutch 20 is engaged, it acts as a brake to rapidly decelerate the main drive shaft 2 down to the speed of the low speed shaft. Accordingly, by closely controlling the timing of the high and low speed shaft clutches so that the low speed shaft clutch and high speed shaft clutch are respectively engaged and disengaged practically instantaneously, the low speed shaft clutch will brake the speed of the main drive shaft and positively rotate the main drive shaft at the lower speed almost instantaneously. Also the use of such pneumatic clutches has the advantage of being able readily to control the hardness or softness of engagement of the clutches for smooth operation at high cycling rates. This means that the tools of the multiple spindle machine being controlled thereby can smoothly be brought up quite close to the work, for example, within thirty thousandths of an inch, during the rapid advance of the tools toward the work to cut down on the idle time without fear of the tools inadvertently coming into contact with the work before the tools are being positively advanced into the work at the lower machining speeds.

Such pneumatic operated disc clutches can be used on both new multiple spindle machines and for retrofitting existing machines that include a lever operated mechanical disc clutch to drive the main drive shaft at the high idle speed and an overrunning roll clutch and drag brake to drive the main drive worm shaft at the lower machining speeds. Also, the low speed pneumatic operated disc clutch of the present invention is uniquely fitted into a restricted area within the main housing in substantial radial alignment with the high speed pneumatic operated disc clutch where both clutches can easily be sprayed with lubricating fluid, Moreover, the clutches are located in close proximity to the gear train between the high and low speed shafts and main drive shaft for ease of maintenance and simplified porting of fluid through lines on the same path to all of the clutches.

If desired, a third pneumatic operated disc brake 60 may be provided on the main drive shaft 2 to permit independent braking of the main drive worm shaft upon disengaging both the high and low speed shaft pneumatic operated disc clutches 10, 20 and engaging the main drive shaft brake 60 to prevent inadvertent rotation during secondary machining such as milling or cross drilling operations. As shown, the brake discs 61 for the main drive shaft brake 60 are suitably connected to the main drive shaft 2 as by providing splined connections therebetween similar to the splined connections between the clutch discs 15 and shaft 3 previously described for rotation of the brake discs 61 with the shaft 2 whereas the brake cage 62 and associated cage discs 63 splined thereto are grounded to one of the bearing walls 64 of the main housing 6 as schematically shown in FIG. 1. Before the main drive shaft clutch 60 is engaged, both the high and low speed brake 10, 20 must be disengaged so that the high and low speed clutch cages 16, 22 are free to be braked along with the main drive shaft. With the high and low speed shaft brake 10, 20 disengaged and the main drive shaft clutch 60 engaged, the high and low speed drive shafts 3, 4 will still continue to rotate, but not their respective brake cages 16, 22.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A high-low speed drive system for a multiple spindle machine, said drive system comprising a main housing, a main drive shaft and high and low speed shafts all mounted for rotation within said main housing, and high and low speed shaft fluid operated disc clutch means associated with the respective high and low speed shafts for selectively coupling said main drive shaft to one or the other of said high and low speed shafts for rotation thereby, said low speed shaft having an idler gear sleeve rotatably journaled thereon, said idler gear sleeve extending coaxially along said low speed shaft both interiorly and exteriorly of said main housing, feed change gear means exteriorly of said main housing for drivingly connecting said idler gear sleeve to said low speed shaft, each of said high and low speed shaft clutch means including clutch discs respectively driven by said high speed shaft and said idler gear sleeve, and clutch cages surrounding the respective clutch discs, said clutch cages being respectively mounted for rotation on said high speed shaft and said idler gear sleeve, said clutch cages having cage discs extending between the respective clutch discs, whereby when said clutch means are engaged, said clutch cages are drivingly connected to the respective high speed shaft and idler gear sleeve, and when said clutch means are disengaged, said clutch cages are free to rotate relative to the respective high speed shaft and idler gear sleeve, said clutch cages having gear teeth thereon in meshing engagement with each other, and said main drive shaft having a gear thereon in meshing engagement with the gear teeth on one of said clutch cages, where upon disengagement of one of said clutch means and engagement of the other of said clutch means, the engaged clutch means will drivingly connect said main drive shaft to the associated high or low speed shaft.

2. The drive system of claim 1 wherein said high and low speed shaft clutch means are pneumatic clutches and are in substantial radial alignment with each other within said main housing.

3. The drive system of claim 1 wherein said clutch cages include hub portions respectively journaled on said high speed shaft and idler gear sleeve, said gear teeth being integrally formed on the exterior surfaces of the respective hub portions.

4. The drive system of claim 1 wherein said clutch means are located in close proximity to each other within said main housing.

5. The drive system of claim 1 wherein said clutch means associated with said low speed shaft is engaged substantially simultaneously with the disengagement of said clutch means associated with said high speed shaft and acts as a brake to rapidly decelerate said main drive shaft down to the speed of said idler gear sleeve.

6. The drive system of claim 1 wherein said gear on said main drive shaft is in meshing engagement with the gear teeth on the clutch cage rotatably mounted on said idler gear sleeve.

7. The drive system of claim 1 wherein said feed change gear means includes two sets of gears, each set including one gear rotatably mounted on said low speed shaft, and another gear rotatably mounted on a feed change gear shaft supported by said main housing, the gears of each set being in meshing engagement with each other, said gears on said feed change gear shaft being drivingly connected together, one of said gears on said low speed shaft being drivingly connected to said low speed shaft, and the other of said gears on said low speed shaft being drivingly connected to the outer end of said idler gear sleeve which extends exteriorly of said main housing.

8. The drive system of claim 7 wherein a single sleeve bearing rotatably supports said one gear of each set and the outer end of said idler gear sleeve on said low speed shaft.

9. The drive system of claim 1 further comprising fluid operated disc brake means on said main drive shaft which provides for independent braking of said main drive shaft upon disengaging both said high and low speed shaft clutch means and engaging said main drive shaft brake means to prevent rotation within the machine during secondary machining operations.

10. The drive system of claim 9 wherein said brake means is located within the interior of said main housing in substantial radial alignment with said high and low speed shaft clutch means, each of said clutch means and brake means being pneumatically operated clutches and brakes, respectively.

11. The drive system of claim 10 wherein said brake means includes brake discs connected to said main drive shaft for rotation therewith, and a brake cage surrounding said brake discs, said brake cage being grounded to said main housing and having cage discs extending between the brake discs of said brake means, whereby when said brake means is engaged, the frictional engagement between said brake discs and cage discs of said brake means will prevent rotation of said main drive shaft.

12. A high-low speed drive system for a multiple spindle machine, said drive system comprising a main housing, a main drive shaft and high and low speed shafts all mounted for rotation within said main housing, and high and low speed shaft pneumatic operated disc clutch means associated with the respective high and low speed shafts for selectively coupling said main drive shaft to one or the other of said high and low speed shafts for rotation thereby, said low speed shaft having an idler gear sleeve rotatably journaled thereon, said idler gear sleeve extending coaxially along said low speed shaft both interiorly and exteriorly of said main housing, feed change gear means exteriorly of said main housing for drivingly connecting said idler gear sleeve to said low speed shaft, each of said high and low speed shaft clutch means including clutch discs respectively driven by said high speed shaft and said idler gear sleeve, and clutch cages surrounding the respective clutch discs, said clutch cages being respectively mounted for rotation on said high speed shaft and said idler gear sleeve, said clutch cages having cage discs extending between the respective clutch discs, whereby when said clutch means are engaged, said clutch cages are drivingly connected to the respective high speed shaft and idler gear sleeve, and when said clutch means are disengaged, said clutch cages are free to rotate relative to the respective high speed shaft and idler gear sleeve, said clutch cages having gear teeth thereon in meshing engagement with each other, and said main drive shaft having a gear thereon in meshing engagement with the gear teeth on one of said clutch cages, where upon disengagement of one of said clutch means and engagement of the other of said clutch means, the engaged clutch means will drivingly connect said main drive shaft to the associated high or low speed shaft, said clutch cages including hub portions respectively journaled on said high speed shaft and idler gear sleeve, said gear teeth being integrally formed on the exterior surfaces of the respective hub portions, and said clutch means associated with said low speed shaft when engaged immediately following disengagement of said clutch means associated with said high speed shaft acting as a brake to rapidly decelerate said main drive shaft down to the speed of said idler gear sleeve.

13. The drive system of claim 12 further comprising pneumatic operated disc brake means on said main drive shaft which provides for independent braking of said main drive shaft upon disengaging both said high and low speed shaft clutch means and engaging said main drive shaft brake means.

14. The drive system of claim 13 wherein said high and low speed shaft clutch means and said brake means are in substantial radial alignment with each other within said main housing.

15. A high-low speed drive system for a multiple spindle machine, said drive system comprising a main housing, a main drive shaft and high and low speed shafts all mounted for rotation within said main housing, and high and low speed shaft pneumatically operated disc clutch means associated with the respective high and low speed shafts for selectively coupling said main drive shaft to one or the other of said high and low speed shafts for rotation thereby, said clutch means being in substantially radial alignment with each other within said main housing, each of said high and low speed shaft clutch means including discs respectively driven by said high speed shaft and low speed shaft, and clutch cages surrounding the respective clutch discs, said clutch cages being respectively mounted for rotation on said high speed shaft and said low speed shaft, said clutch cages having cage discs extending between the respective clutch discs, whereby when said clutch means are engaged, said clutch cages are drivingly connected to the respective high and low speed shafts, and when said clutch means are disengaged, said clutch cages are free to rotate relative to the respective high and low speed shafts, said clutch cages having gear teeth thereon in meshing engagement with each other, and said main drive shaft having a gear thereon in meshing engagement with the gear teeth on one of said clutch cages, where upon disengagement of one of said clutch means and engagement of the other of said clutch means, the engaged clutch means will drivingly connect said main drive shaft to the associated high or low speed shaft.

16. The drive system of claim 15 wherein said clutch cages include hub portions respectively journaled on said high and low speed shafts, said gear teeth being integrally formed on the exterior surfaces of the respective hub portions.

17. The drive system of claim 16 wherein said clutch means are located in close proximity to each other within said main housing.

18. The drive system of claim 15 further comprising pneumatically operated disc brake means on said main drive shaft which provides for independent braking of said main drive shaft upon disengaging both said high and low speed shaft clutch means and engaging said main drive shaft brake means to prevent rotation within the machine during secondary machining operations.

19. The drive system of claim 18 wherein said brake means is located within the interior of said main housing in substantial radial alignment with said high and low speed shaft clutch means, said brake means including brake discs connected to said main drive shaft for rotation therewith, and a brake cage surrounding said brake discs, said brake cage being grounded to said main housing and having cage discs extending between said brake discs, whereby when said brake means is engaged, the frictional engagement between said brake discs and cage discs of said brake means will prevent rotation of said main drive shaft.

* * * * *